United States Patent [19]

Atsumi et al.

[11] Patent Number: 4,644,133
[45] Date of Patent: Feb. 17, 1987

[54] CERAMIC HEATER

[75] Inventors: Morihiro Atsumi, Okazaki; Naochika Nunogaki, Kariya; Novuei Ito, Okazaki; Naohito Mizuno, Nishio, all of Japan

[73] Assignees: Nippondenso Co., Ltd., Kariya; Nippon Soken, Inc., Nishio, both of Japan

[21] Appl. No.: 832,767

[22] Filed: Feb. 25, 1986

[30] Foreign Application Priority Data

Feb. 28, 1985 [JP]  Japan ................... 60-39646

[51] Int. Cl.⁴ .................. F23Q 7/22; F02N 17/00
[52] U.S. Cl. ............................. 219/270; 123/145 A; 219/553; 338/326; 338/330; 361/264; 361/266
[58] Field of Search ............ 123/145 A; 219/553, 219/270; 338/326, 330; 361/266, 264

[56] References Cited

U.S. PATENT DOCUMENTS

| | | | |
|---|---|---|---|
| 2,955,145 | 10/1960 | Schrewelius | 136/239 |
| 3,002,936 | 10/1961 | Allenbach et al. | 252/518 |
| 3,248,346 | 4/1966 | Amberg et al. | 252/518 |
| 3,321,727 | 5/1967 | Schrewelius | 338/330 |
| 3,454,345 | 7/1969 | Dyre | 431/66 |
| 3,875,476 | 4/1975 | Crandall et al. | 361/264 |
| 3,875,477 | 4/1975 | Fredriksson et al. | 361/264 |
| 3,895,219 | 7/1975 | Richerson et al. | 219/553 |
| 4,107,510 | 8/1978 | Tombs et al. | 219/270 |
| 4,320,165 | 3/1982 | Cash | 428/213 |
| 4,357,526 | 11/1982 | Yamamoto et al. | 219/544 |
| 4,475,029 | 10/1984 | Yoshida et al. | 219/270 |
| 4,486,651 | 12/1984 | Atsumi et al. | 219/553 |

Primary Examiner—E. A. Goldberg
Assistant Examiner—Gerald E. Preston
Attorney, Agent, or Firm—Cushman, Darby & Cushman

[57] ABSTRACT

A ceramic heater has a heater element made of a mixture including $MoSi_2$ and $Si_3N_4$ powder as a main ingredient and silica ($SiO_2$) powder as an additive, a heater support member made of an electrically insulating ceramic sintered body for supporting the heater element and an electric current supply means for supplying an electric current to the heater element. The composition of the mixture for the heater element is defined so as to satisfy the following formula: $0.035 \leq B/A < 0.35$ where A is the amount of $Si_3N_4$ expressed by mol percent of the total amount of the main ingredient of $MoSi_2$ and $Si_3N_4$ and B is the amount of $SiO_2$ expressed by mol percent of the total amount of the main ingredient of $MoSi_2$ and $Si_3N_4$.

5 Claims, 8 Drawing Figures

CERAMIC HEATER

BACKGROUND OF THE INVENTION

1. Field of the Invention

The present invention relates to a ceramic heater, especially a ceramic heater suitably employed as a glow plug in a diesel engine.

2. Description of the Prior Art

In diesel engines, glow plugs are employed for starting engines in an atmosphere of low temperatures and these glow plugs are required to be provided with a heater having a rapidly heating property in order to improve the startability of engines.

The present inventors have developed a ceramic heater comprising a supporting member made of electrically insulating ceramic sintered body, a heater element formed by bonding a ceramic sintered body of $MoSi_2$ and $Si_3N_4$ to a top end of the supporting member, and lead wires embedded in the supporting member and connected to the heater element (U.S. application Ser. Nos. 717,875 and 739,474).

This ceramic heater has oxidization resistance at high temperatures due to the existence of $MoSi_2$ and thermal shock resistance due to the existence of $Si_3N_4$. Therefore, this ceramic heater can be employed in a combustion chamber of a diesel engine without being covered with any covering member and accordingly, exhibits an excellent rapidly heating property.

The temperature of glow plugs is controlled in accordance with the driving condition of engines. In cold districts where the ambient temperature is not more than $-15°$ C., it takes time until the diesel engines become the state of good startability. So, the diesel engines are earnestly desired to have good startability at low temperatures similar to gasoline engines, and accordingly, the heaters are desired to generate heat of about 1300° C. to 1400° C. for the above purpose.

However, the ceramic heater made of $MoSi_2$ and $Si_3N_4$ cannot maintain good durability at a heating temperature of the heater as high as 1300° C. or more.

SUMMARY OF THE INVENTION

One object of the present invention is to provide a ceramic heater having excellent oxidization resistance, thermal shock resistance and a good rapidly heating property.

Another object of the present invention is to provide a ceramic heater having excellent durability at temperatures as high as 1300° C. or more.

The ceramic heater of the present invention comprises a heater element made of a ceramic sintered body which generates heat upon receiving an electric current, a heater support member made of an electrically insulating ceramic sintered body for supporting the heater element and an electric current supply means for supplying an electric current to the heater element.

The heater element used in the ceramic heater of the present invention is formed of a sintered body of a mixture including $MoSi_2$ and $Si_3N_4$ powder as a main ingredient and silica ($SiO_2$) powder as an additive.

The sintered body for the heater element is composed of $MoSi_2$, $Si_3N_4$ and $Si_2N_2O$ converted from part of $Si_3N_4$.

In the above described mixture, the composition thereof is defined so as to satisfy the following formula:

$$0.035 \leq B/A < 0.35$$

where A is the amount of $Si_3N_4$ expressed by mol percent of the total amount of the main ingredient of $MoSi_2$ and $Si_3N_4$ and B is the amount of $SiO_2$ expressed by mol percent of the total amount of the main ingredient of $MoSi_2$ and $Si_3N_4$.

When the ratio B/A reaches 0.035, part of $Si_3N_4$ is converted to siliconoxinitride ($Si_2N_2O$) in the sintered body. $Si_2N_2O$ is excellent in heat resistance, and especially oxidization resistance at high temperatures and the existence of $Si_2N_2O$ enables the long period usage of the heater element of which the heating temperature is not less than 1300° C.

When the ratio B/A reaches 0.35, α-cristobalite is formed in the sintered body. This α-cristobalite is converted to β-cristobalite at about 200° C. to generate cracks in the heater element due to distortion occurring when α-cristobalite is converted to β-cristobalite. From this reason, the existence of α-cristobalite is not preferable.

$SiO_2$ itself, aluminum silicate, silica glass, high silicate glass or the like can be employed as the substance supplying $SiO_2$.

Preferably, the above described mixture is composed of 30 to 65 mol% of $MoSi_2$ and 70 to 35 mol% of $Si_3N_4$. The composition ratio of $Si_3N_4$ exceeds 70 mol%, the specific resistance of the heater element is undesirably increased though the thermal shock resistance thereof is improved.

DETAILED DESCRIPTION OF THE EMBODIMENTS

Figure 1:
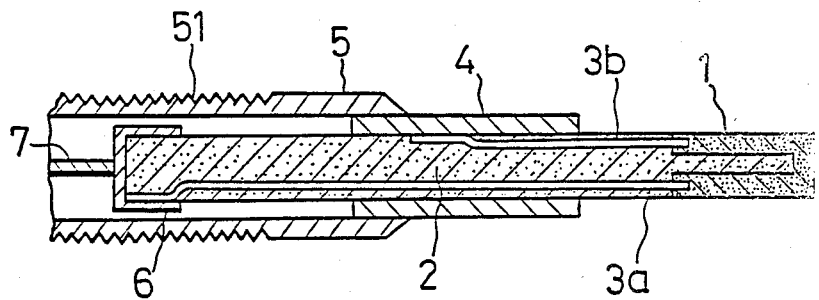
FIG. 1 is a sectional view of a glow plug provided with a ceramic heater according to the present invention.

FIG. 1 illustrates a glow plug provided with a ceramic heater according to the present invention.

The ceramic heater is composed of a rod-shaped supporting member 2 formed of a ceramic sintered body, a heater element 1 having a U-shaped cross section, formed of a ceramic sintered body and bonded to an end surface of the supporting member 2, and a pair of lead wires 3a and 3b embedded in the supporting member 2. A top end of each of the lead wires 3a and 3b is connected to the heater element 1.

A metallic sleeve 4 is secured to the outer periphery of the supporting member 2 and a metallic body 5 is secured to the outer periphery of the metallic sleeve 4.

A rear end of the lead wire 3a extends to a base end of the supporting member 2 and is in contact with a metallic cap 6 fit in the base end of the supporting member 2.

The metallic cap 6 is electrically connected to an electric power source (not shown) through a nickel line 7. The glow plug having the above described structure is secured to an engine so as to be exposed to the interior of a combustion chamber thereof by a screw 51 formed in the metallic body 5.

The supporting member 2 is formed of a sintered body of a mixture of $Si_3N_4$ and $Al_2O_3$ (alumina).

The heater element 1 is formed of a sintered body of a mixture of $MoSi_2$, $Si_3N_4$ and $SiO_2$. The composition ratio of each material of the above mixture is adjusted so as to satisfy the following formula: $0.035 \leq B/A < 0.35$ where A is the amount of $Si_3N_4$ expressed by mol percent of the total amount of the main ingredient of $MoSi_2$ and $Si_3N_4$ and B is the amount of $SiO_2$ expressed by mol percent of the total amount of the main ingredient of $MoSi_2$ and $Si_3N_4$.

In the obtained heater element, part of $Si_3N_4$ is converted to $Si_2N_2O$.

Figure 2:
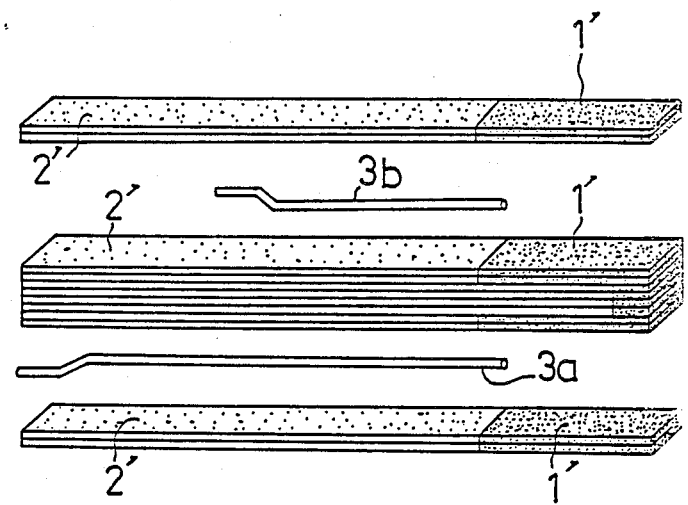
FIG. 2 is a view illustrating one producing step of the ceramic heater.

FIG. 2 is a view explaining one producing step of the ceramic heater according to the present invention.

At first, $MoSi_2$ powder, $Si_3N_4$ powder, $SiO_2$ powder and organic solvent are mixed and a plurality of ceramic sheets 1' for the heater element are formed from the obtained mixture by a doctor blade method.

Next, $Si_3N_4$ powder, $Al_2O_3$ powder and organic solvent are mixed and a plurality of ceramic sheets 2' for the supporting member are formed from the obtained mixture by a doctor blade method.

The obtained ceramic sheets 1' and 2' are piled on one another, respectively as shown in FIG. 2 and the lead wires 3a ad 3b are also disposed as shown in FIG. 2.

Then, the piled ceramic sheets 1' and 2' with the lead wires 3a and 3b are hot-pressed at a temperature of 1600° C. and under a pressure of 500 Kg/cm² to obtain a ceramic heater shown in FIG. 1.

Hereinafter, the experimental results on the heater element of the ceramic heater according to the present invention will be explained.

A mixture powder composed of $MoSi_2$ powder(average particle diameter: 0.9 μm), $Si_3N_4$ powder (average particel diameter: 35 μm) is mixed with $SiO_2$ powder(average particle diameter: 1 μm) as an additive. Then, the obtained mixture is sintered to obtain a sintered body for a heater element.

Figure 3:
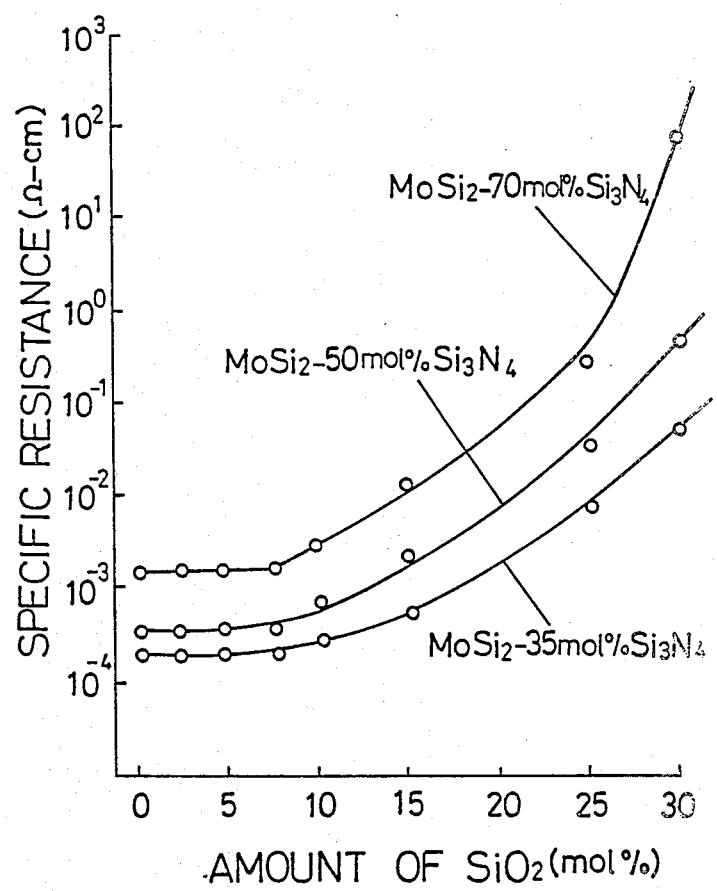
FIGS. 3, 4, 5, 6 and 7 are graphs showing the experimental results on the ceramic heater according to the present invention.

The relation between the composition ratio of the materials and the specific resistance of the obtained sintered body is shown in FIG. 3.

In FIG. 3, the composition ratio of $Si_3N_4$ is shown by mol percent of the main ingredient of $MoSi_2$ and $Si_3N_4$, and the composition ratio of $SiO_2$ is shown by mol percent of the total amount of the main ingredient of $MoSi_2$ and $Si_3N_4$.

As shown in FIG. 3, the specific resistance is increased with the increase of the amount of $SiO_2$.

Next, the structure of the sintered bodies having different amounts of $Si_3N_4$ and $SiO_2$ is examined by a X ray analysis. The obtained result is shown in the following table. In this table, marks mean existence of substance and marks ○ mean nonexistence of substance.

| $SiO_2$ (B) / $Si_3N_4$ (A) | 0 | 0.035 | 0.14 | 0.35 |
| --- | --- | --- | --- | --- |
| $Si_3N_4$ | ○ | ○ | ○ | ○ |
| $MoSi_2$ | | ○ | ○ | ○ |
| $Si_2N_2O$ | — | ○ | ○ | ○ |
| α-cristobalite | — | — | — | ○ |

As shown in the above table, when the ratio B/A reaches 0.035, part of $Si_3N_4$ is converted to $Si_2N_2O$. $Si_2N_2O$ is excellent in oxidization resistance at high temperatures and accordingly serves to improve the heat resistance of the sintered body.

When the amount of additive $SiO_2$ is increased and the ratio B/A reaches 0.35, α-cristobalite begins to be formed.

As described above, the existence of α-cristobalite is not preferable since cracks are formed when the sintered bodies containing α-cristobalite are heated.

From the above result, the amount of $SiO_2$ for the heater element must be defined so as to satisfy the formula $0.035 \leq B/A < 0.35$.

Figure 4:
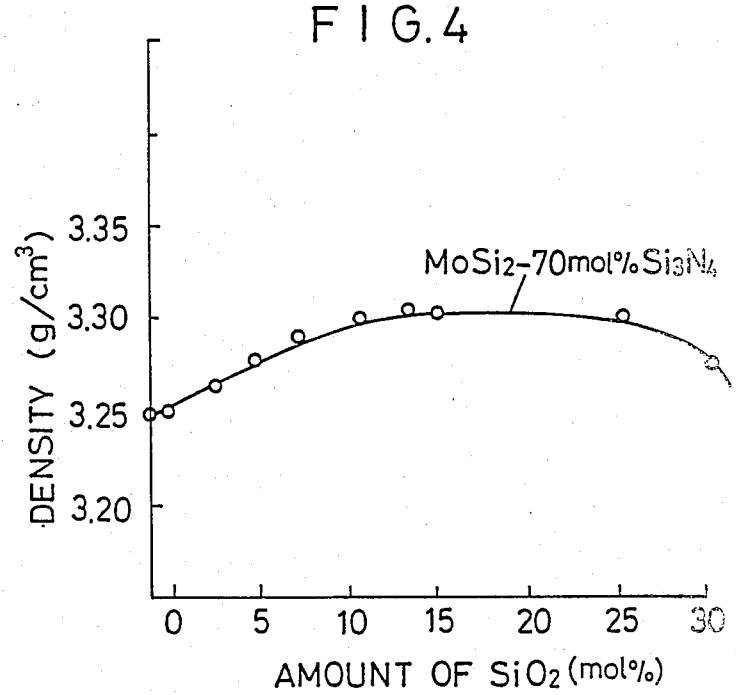
Figure 5:
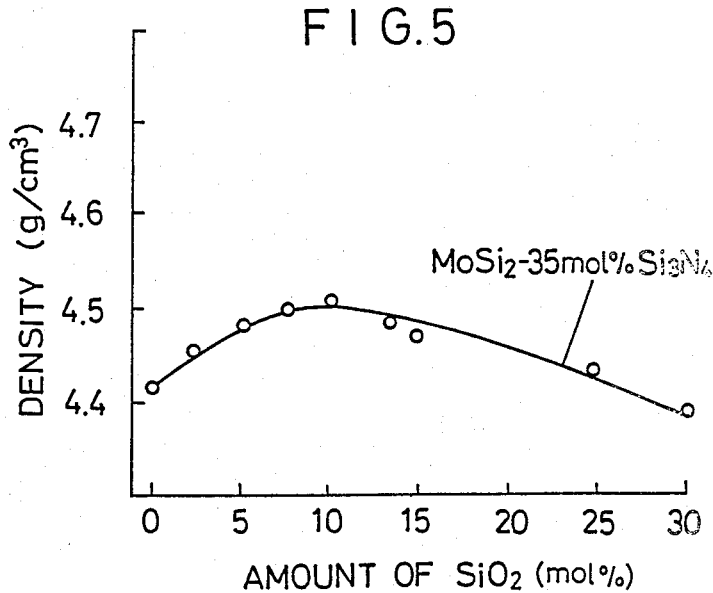

FIGS. 4 and 5 show the relation between the amount of $SiO_2$ added to the main ingredient of $MoSi_2$-70 mol%$Si_3N_4$ and $MoSi_2$-35 mol%$Si_3N_4$ and the density of the obtained sintered bodies.

In the former case, when the amount of $SiO_2$ is about 10 to 20 mol%, high density can be obtained and accordingly, heat resistance of the sintered body can be improved. When the amount of $SiO_2$ is 25 mol%, the ratio B/A is larger than 0.35 and α-cristobalite is formed in the sintered body.

In the latter case, when the amount of $SiO_2$ is about 5 to 10 mol%, high density can be obtained and when the amount of $SiO_2$ is 13 mol%, α-cristobalite is formed in the obtained sintered body.

As is apparent from the experimental results shown in FIGS. 4 and 5, the addition of $SiO_2$ in such an amount as satisfying the formula of $0.035 \leq B/A < 0.35$ serves to increase the density of the obtained sintered body.

Figure 6:
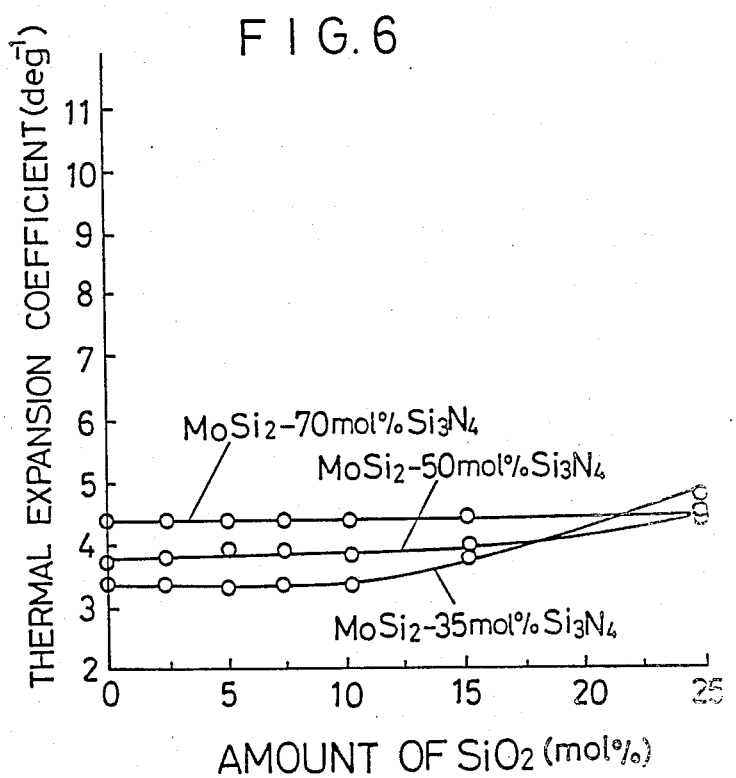

FIG. 6 shows the relation between the amount of additive $SiO_2$ and the thermal expansion coefficient of the obtained sintered bodies.

As is apparent from FIG. 6, in all of the sintered bodies of $MoSi_2$-70 mol%$Si_3N_4$, $MoSi_2$-50 mol%$Si_3N_4$ and $MoSi_2$-35 mol%$Si_3N_4$, the thermal expansion coefficient thereof scarcely increases by the addition of $SiO_2$ in the amount within the range defined in the present invention.

Figure 7:
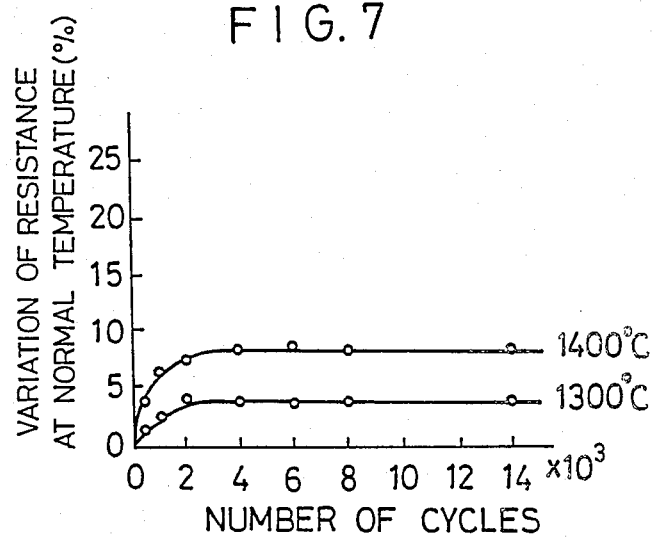

FIG. 7 shows the result of examination on the variation of the resistance of a glow plug(resistance at a normal temperature is 0.18Ω) formed by sintering a mixture powder of $MoSi_2$-70mol% $Si_3N_4$ with an additive powder of 25mol% of $SiO_2$(B/A≈0.035) and securing the obtained sintered body to a supporting member made of a sintered body of $Si_3N_4$-50mol%$Al_2O_3$.

Figure 8:
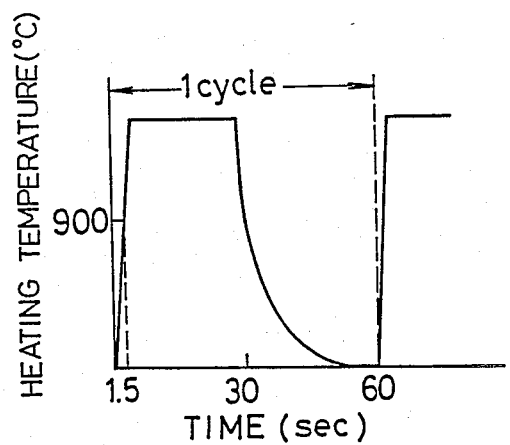
FIG. 8 is a view showing one example of conditions of one experiment.

In this experiment, the glow plug is subjected to a number of cooling and heating cycles as shown in FIG. 8 by intermittently applying electric current to the glow plug, and the variation of the resistance of the heater elements of which the heating temperature is 1300° C. and 1400° C., respectively, is examined.

As is shown in FIG. 7, the resistance of the heater element is changed only within 10% when the amount of $SiO_2$ is 2.5 mol%.

In contrast, when the glow plug having a heater element made of a sintered body of $MoSi_2$-70mol%-$Si_3N_4$ without $SiO_2$ being added thereto is subjected to the same cooling and heating cycles, the resistance of the heating element is increased over 10% with the increase of the number of cycles.

When the amount of $SiO_2$ is 25 mol%(B/A>0.35), the heater element is damaged due to cracks formed therein at the moment of generating heat.

From the above experimental results, it has become clear that by adding not less than 2.5 mol% of $SiO_2$ powder to a mixture powder of $MoSi_2$-70 mol%$Si_3N_4$, $Si_2N_2O$ having excellent oxidization resistance at high temperatures is formed in the obtained heater element. Furthermore, in this case, the density of the obtained heater element is increased as shown in FIGS. 4 and 5 to make the structure thereof compact. This results in the heat resistance of the heater element is largely improved.

However, when the amount of additive $SiO_2$ exceeds 25 mol%, α-cristobalite is formed in the heater element. And when this α-cristobalite is phase-transferred to α-cristobalite, distortion is generated to damage high temperature heater element.

As described above, the ceramic heater of the present invention is excellent in its rapidly heating property and exhibits good durability at temperatures as high as 1300° C.

Accordingly, the ceramic heater of the present invention is suitable to a heater for a glow plug of a diesel engine.

What is claimed is:

1. A ceramic heater comprising:
   a heater element made of a ceramic sintered body which generates heat upon receiving an electric current;
   a heater support member made of a electrically insulating ceramic sintered body, said heater element being affixed to one end of said heater support member; and
   an electric current supply means for supplying an electric current to said heater element;
   said heater element being a sintered body of a mixture including $MoSi_2$ and $Si_3N_4$ powder as a main ingredient and $SiO_2$ powder as an additive; said sintered body being composed of $MoSi_2$, $Si_3N_4$ and siliconoxinitride converted from part of $Si_3N_4$;
   said mixture having a composition expressed by the formula: $0.035 \leq B/A < 0.35$ where A is the amount of $Si_3N_4$ powder expressec by mol percent of the total amount of said main ingredient and B is the amount of $SiO_2$ powder expressed by mol percent of the total amount of said main ingredient.

2. A ceramic heater according to claim 1, wherein said main ingredient is composed of 30 to 65 mol% of $MoSi_2$ powder and 70 to 35 mol% of $Si_3N_4$ powder.

3. A ceramic heater according to claim 1, wherein said $SiO_2$ powder is supplied from a material selected from the group consisting of silica, aluminum silicate, silica glass and high silicate glass.

4. A ceramic heater according to claim 1, wherein said electric current supply means comprises a pair of lead wires for connecting said heater element to an electric power source, and said lead wires are embedded within said heater support member.

5. A ceramic heater according to claim 4, wherein said heater element is integrally sintered with said heater support member.

* * * * *